(12) United States Patent
Izumi

(10) Patent No.: US 6,870,874 B2
(45) Date of Patent: *Mar. 22, 2005

(54) COMMUNICATION APPARATUS

(75) Inventor: Michihiro Izumi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/429,230

(22) Filed: Apr. 25, 1995

(65) Prior Publication Data

US 2003/0091099 A1 May 15, 2003

(30) Foreign Application Priority Data

Apr. 28, 1994 (JP) .............................................. 6-114036

(51) Int. Cl.$^7$ .............................................. H04B 1/713
(52) U.S. Cl. ...................... 375/132; 370/441; 455/179.1
(58) Field of Search ................. 375/202, 260; 370/94.1, 95.1, 95.2, 319–322, 335–337, 342–345, 349, 441–443; 455/179.1, 34.1, 34.2, 62

(56) References Cited

U.S. PATENT DOCUMENTS

| 4,439,859 A | * | 3/1984 | Donnan ........................ 371/32 |
| 4,803,685 A | * | 2/1989 | Oget ............................ 371/33 |
| 4,850,036 A | * | 7/1989 | Smith .......................... 375/202 |
| 4,872,205 A | * | 10/1989 | Smith ........................... 455/34 |
| 5,177,767 A |   | 1/1993 | Kato ............................... 375/1 |
| 5,471,469 A | * | 11/1995 | Flammer, III et al. ...... 375/202 |
| 5,504,750 A | * | 4/1996 | Fulghum et al. ............ 375/202 |
| 5,528,622 A | * | 6/1996 | Cadd et al. ................. 375/202 |

* cited by examiner

Primary Examiner—Temesghen Ghebretinsae
(74) Attorney, Agent, or Firm—Fitzpatrick, Cella, Harper & Scinto

(57) ABSTRACT

In a communication system using frequency hopping to transmit data packets, a transmission request from a transmitter is transmitted through a first control channel. The transmission request includes a frequency channel designation selecting one of plural data channels. A receiver that receives the transmission request sends a receive confirmation through a second control channel and the data packets are then transmitted through the data channels so that the data channel is changed each time a data packet is transmitted.

12 Claims, 11 Drawing Sheets

FIG. 3

CONTROL PACKET

| FLAG | TRANSMISSION-DESTINATION ADDRESS | TRANSMISSION-SOURCE ADDRESS | PACKET TYPE | SPECIFIED FREQUENCY | CRC | FLAG |

PACKET TYPE — TRANSMISSION REQUEST OR RECEIVE READY
SPECIFIED FREQUENCY — F3 TO F22

DATA PACKET

| FLAG | TRANSMISSION-DESTINATION ADDRESS | TRANSMISSION-SOURCE ADDRESS | TRANSMISSION DATA | CRC | FLAG |

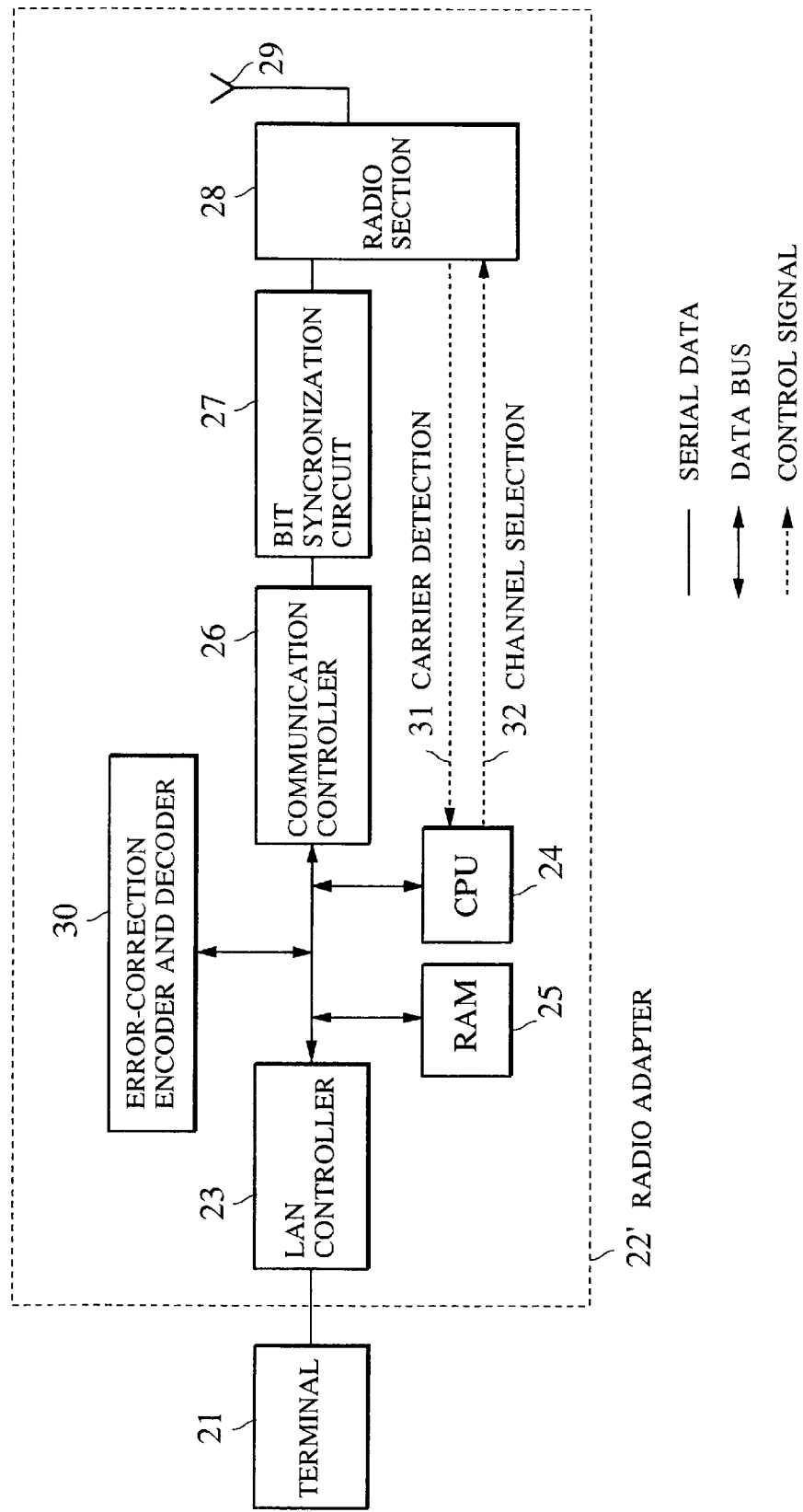

COMMUNICATION APPARATUS

BACKGROUND OF THE INVENTION

1. Field of the Invention

The present invention relates to a communication apparatus which communicates through a plurality of data transmission channels.

2. Description of the Related Art

In these days, the demand for digital-radio data communication has been increasing. To respond to the demand, spread spectrum communication, which is one of digital-radio communication methods, has been used. In spread spectrum communication, slow frequency hopping has frequently been used due to its simplified configuration.

In slow frequency hopping, the used frequency is changed for each set of a plurality of data bits to reduce effects of narrow-band noise when data is re-transmitted if an error occurs, and to obtain a frequency-diversity effect. However, the sending and receiving sides are required to be synchronized to effect frequency switching.

Conventionally, to get synchronization, the receiving side slightly converts the phase of a hopping pattern until the phases of the hopping patterns used in the sending and receiving sides match. Use of a matched filter has been proposed for high-speed synchronization.

The above-described conventional system has drawbacks, complicated hardware as well as long synchronization-acquisition time.

When there are a plurality of hopping patterns and a plurality of radio communication channels, the same frequency may be used at the same time for different transmissions, increasing the data error rate.

Due to these drawbacks, frequency-hopping multiple access could not be readily implemented. As a result, it was difficult to use available frequencies efficiently, and it is hard to configure a system having large transmission capacity.

SUMMARY OF THE INVENTION

Accordingly, it is an object of the present invention to increase transmission capacity.

Another object of the present invention is to implement high-speed synchronization acquisition.

Still another object of the present invention is to make a circuit configuration compact.

Yet another object of the present invention is to reduce the data error rate.

A further object of the present invention is to maintain the transmission rate regardless of increased traffic.

Other objects of the present invention will become clear with the following descriptions of embodiments and accompanying drawings.

The invention is directed to a communication system having plural data channels and a data channel selector. A data channel is selected and selection data indicating the selected data channel is transmitted. Data packets are then transmitted through the selected data channels.

BRIEF DESCRIPTION OF THE DRAWINGS

FIG. 3 shows the formats of packets used in the first embodiment.

FIG. 11 is a block diagram illustrating the configuration of a radio adapter according to a third embodiment of the present invention.

FIG. 12 shows the format of a packet used in the third embodiment.

DESCRIPTION OF THE PREFERRED EMBODIMENTS

Figure 1:
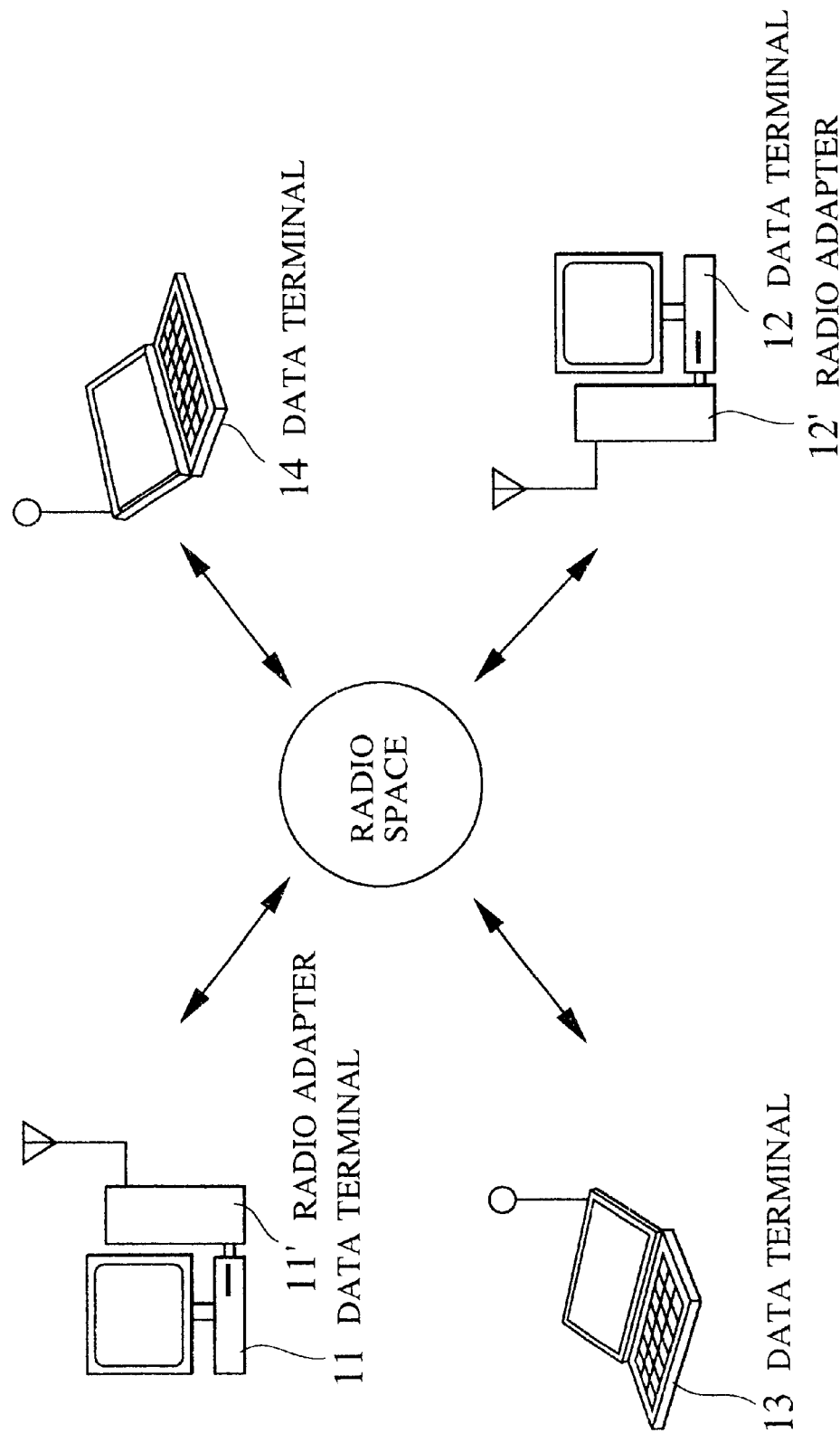
FIG. 1 illustrates the configuration of a radio system in a first embodiment according to the present invention.

FIG. 1 illustrates the configuration of a radio system in a first embodiment according to the present invention. This system comprises a first data terminal 11, a second data terminal 12, a third data terminal 13 and a fourth data terminal 14, as shown in FIG. 1. The first data terminal 11 has a first radio adapter 11', and the second data terminal 12 has a second radio adapter 12'. In this embodiment, a data terminal connects to an adapter having a radio section with the Ethernet interface. The third data terminal 13 and the fourth data terminal 14 incorporate radio transfer sections corresponding to radio adapters, respectively.

Figure 2:
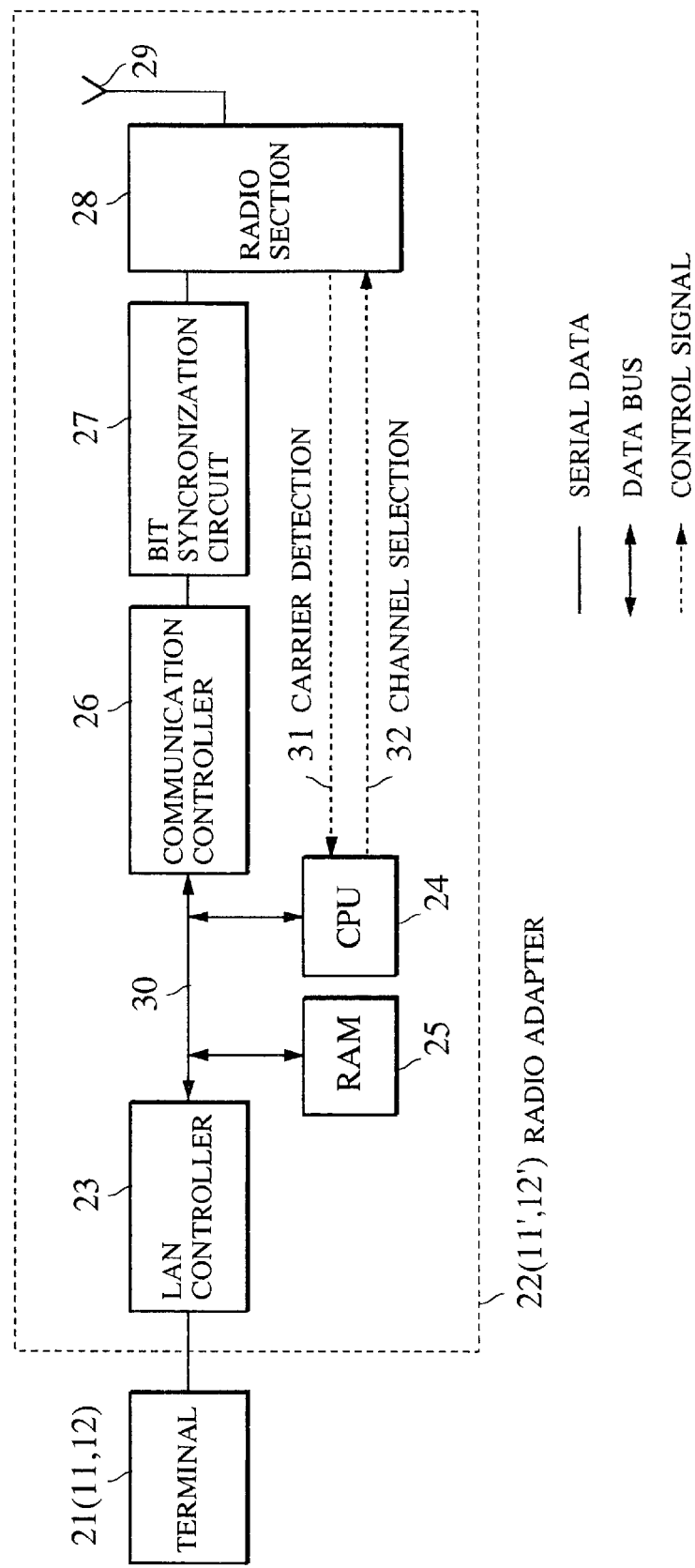
FIG. 2 is a block diagram illustrating the configuration of a radio adapter according to the first embodiment.

FIG. 2 is a block diagram illustrating the configuration of the radio adapter 22 (adapter 11' or 12' described above) according to the first embodiment. This radio adapter 22 comprises a LAN controller 23 which connects to a data terminal 21 (data terminal 11 or 12 described above); a CPU 24 for controlling the radio adapter 22; a RAM 25 for storing data; a communication controller 26 for forming and dividing a packet; a bit-synchronization circuit (DPLL) 27; a radio section 28 including a modulation unit and demodulation unit; a radio communication antenna 29; and a data bus 30 for transferring data. Between the CPU 24 and the radio section 28, control signals, such as a carrier detection signal 31 and a channel selection signal 32, are transferred.

Figure 4:
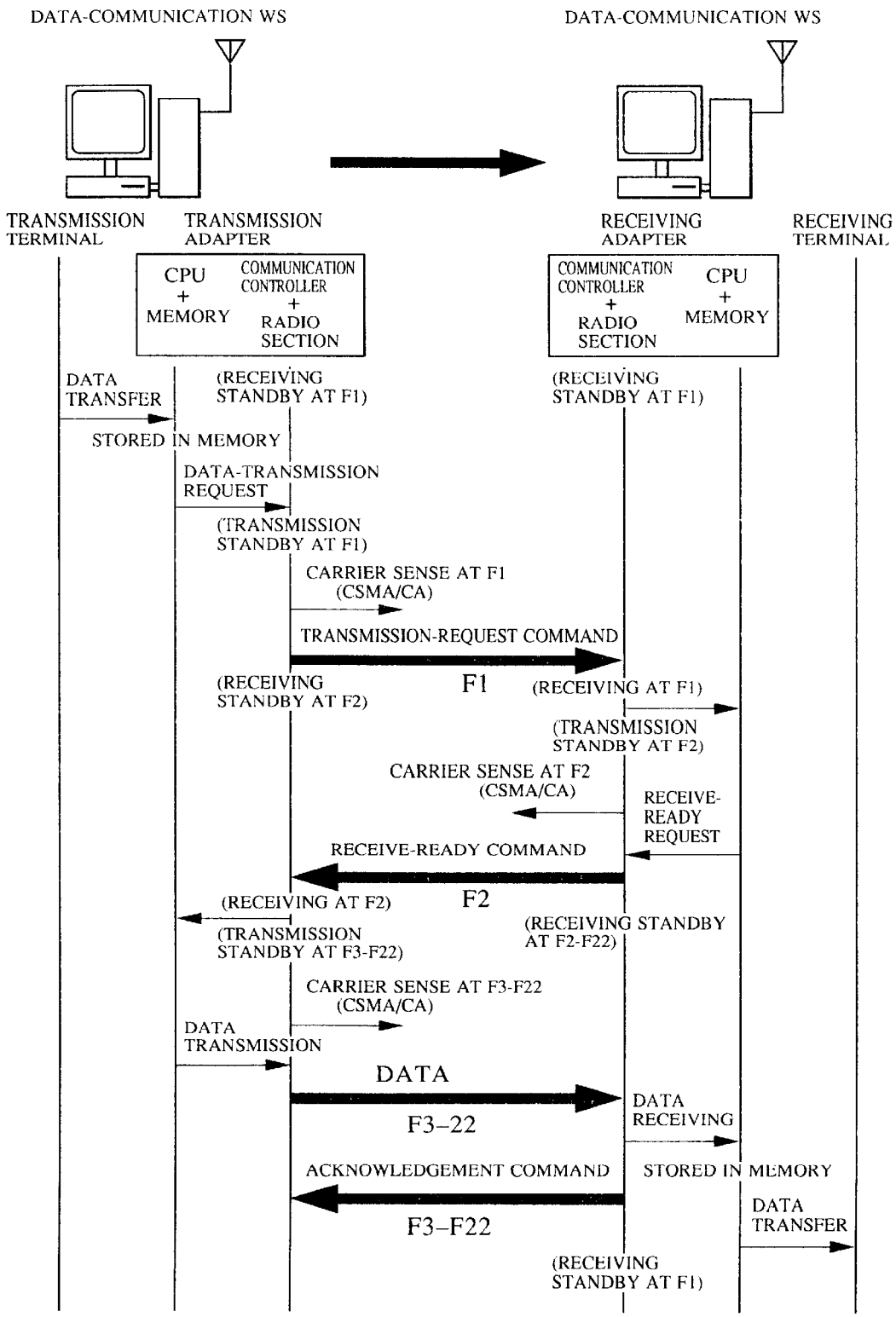
FIG. 4 illustrates an operation sequence in the first embodiment.
Figure 5:
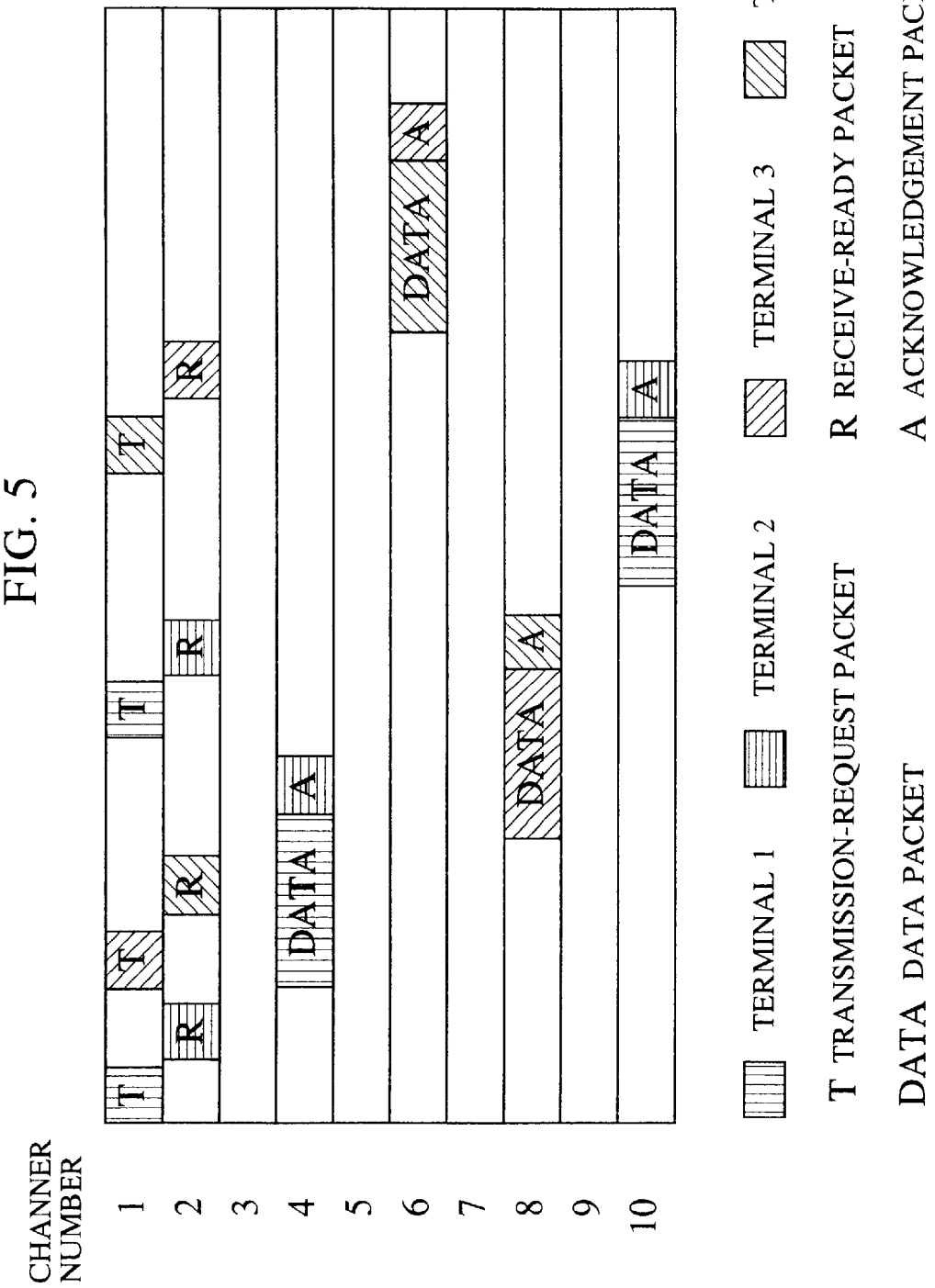
FIG. 5 is a chart indicating use of channels in the first embodiment.
Figure 6:
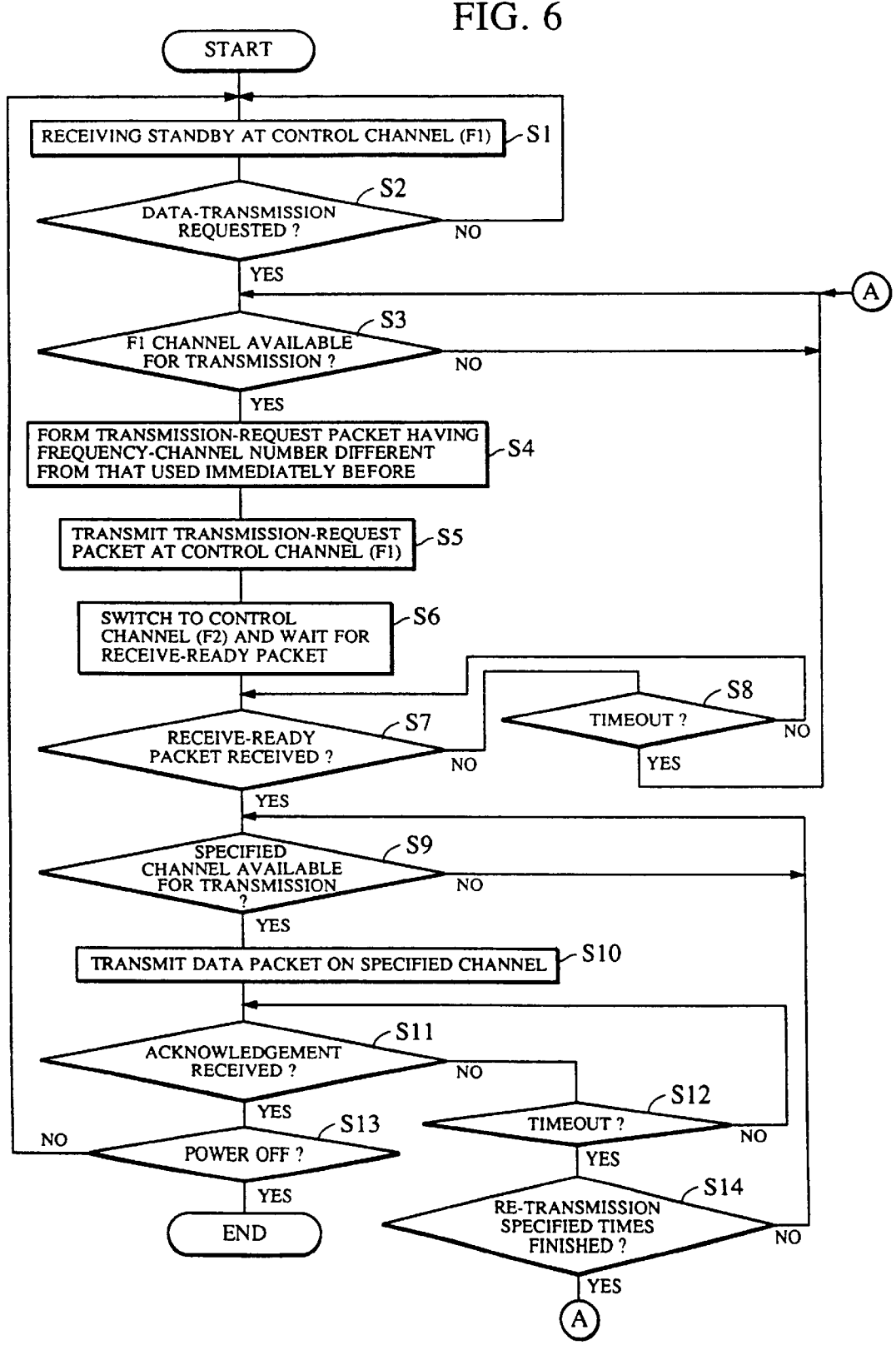
FIG. 6 is a flowchart illustrating an operation of the transmission side in the first embodiment.
Figure 7:
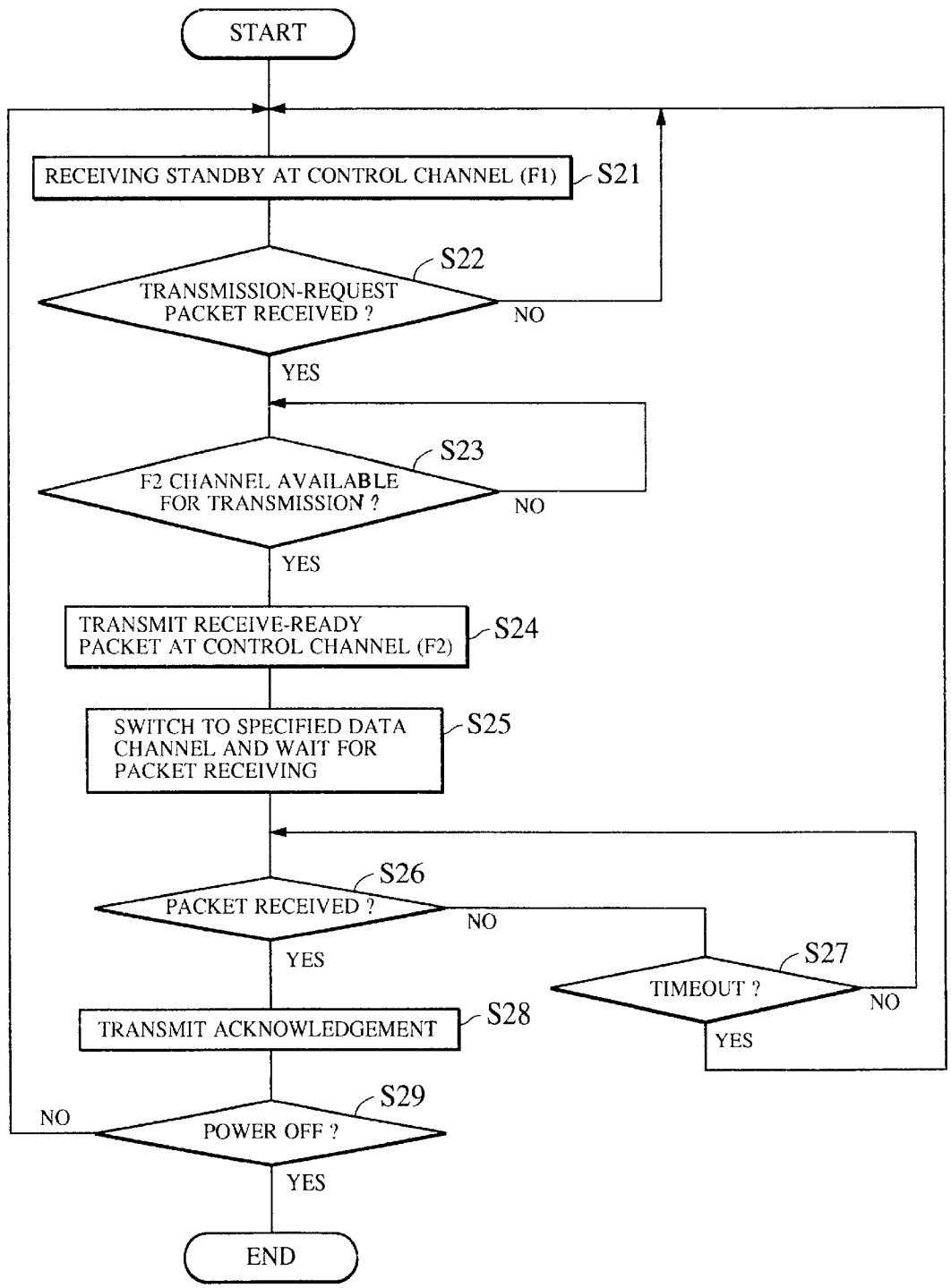
FIG. 7 is a flowchart illustrating an operation of the receiving side in the first embodiment.

FIG. 3 shows the formats of packets used in the first embodiment. FIG. 4 illustrates an operation sequence in the first embodiment. FIG. 5 is a chart indicating use of channels in the first embodiment. This chart shows the state wherein the above-described four terminals communicate with each other. FIG. 6 is a flowchart illustrating an operation of the CPU 24 in the radio adapter 22 when the radio adapter is used for transmitting data in this embodiment. FIG. 7 is a flowchart illustrating an operation of the CPU 24 of the radio adapter 22 when the radio adapter is used for receiving data.

In this embodiment, a case in which the first data terminal 11 sends data to the second data terminal 12 will be described below first.

When the CPU 24 of the first radio adapter 11' is in the standby state (step S1), if the first data terminal generates a data transmission request (step S2), the data terminal 11 sends a data packet to the radio adapter 11'. Conforming to the usual Ethernet interface rule, a data packet to be sent is about 50 to 1,500 octets long. The data packet is transferred to the RAM 25 through the LAN controller 23.

At this stage, a radio channel to be used for transmitting data needs to be determined between the first radio adapter 11' and the second radio adapter 12'. All idling radio adapters, including the second radio adapter 12', are in their standby states at frequency channel 1 (F1) which is determined to be used for control in advance. The CPU 24 of the first radio adapter 11' uses a carrier detection signal 31 to monitor the use of frequency channel 1 (step S3). When the channel is available for transmission, the CPU 24 creates a control packet (transmission-request control packet) shown in FIG. 3 and sends it (steps S4 and S5).

A control packet contains information items, such as a transmission-destination address, the frequency channel number selected for data transmission (for example, No. 4), and a packet type (transmission request or receiving confirmation). To provide the characteristics of slow frequency hopping, which changes the frequency used in a short period, the CPU 24 selects a channel other than those selected most recently in step S4. This can be achieved by selecting a frequency channel from channels F3 to F22 in a predetermined order. After the transmission-request control packet has been sent, the CPU 24 switches the channel with a channel selection signal 32 and the first radio adapter becomes idle at frequency channel 2 used for a second control (step S6).

When the CPU 24 of the second radio adapter 12' is in the standby state (step S21), if the CPU 24 of the radio adapter receives the transmission-request control packet (step S22), the CPU sends a control packet (receive-ready control packet) for acknowledging start of transmission through a frequency channel 2 (F2) (step S23 and S24), then it enters the standby state at frequency channel 4 used for data, which has been specified in the transmission request packet previously sent (step S25).

In the procedure described above, both terminals have decided the frequency channel in which a data packet is to be transferred. The first radio adapter starts sending a data packet in the following way. When the CPU 24 of the first radio adapter 11' receives the receive-ready control packet within a certain time, it monitors, in the same procedure as that used in transmitting a control packet, the use of frequency channel 4 to be used, by measuring the field intensity at the frequency of channel 4. If the channel is being used, the CPU waits for the channel to become available for transmission (step S9). When the channel becomes available for transmission, the CPU 24 follows a data packet transmission procedure (step S10). The data previously sent from the first data terminal 11 is read from the RAM 25. The CPU adds a flag, transmission destination address, transmission-source address, and CRC check section for error detection to the read data to form a frame, and sends it to the radio section 28. The radio section 28 sends a preamble signal, then the data.

Meanwhile, the CPU 24 of the second radio adapter 12', which is the receiving side in this case, monitors the use of frequency channel 4 to be used (steps S26 and S27). When the CPU receives the packet, it stores the received data in the RAM 25 only when the destination address described in the packet matches that of the terminal and no error is detected in the packet according to the check at the CRC check section. At the same time, the CPU 24 forms an acknowledgement packet and sends it to the first radio adapter 11' using channel 4 (step S28).

When the CPU 24 in the transmission side receives the acknowledgement packet through channel 4 (step S11), it terminates the data transmission. When data communication is terminated, the CPU waits to receive the next data from the first terminal and also enters the standby state at channel 1 to receive a control packet sent from other radio adapters (step S1, and step S21).

If the transmission side does not receive the acknowledgement packet within a certain time (step S12), the transmission side sends the data repeatedly a certain number of times or until it receives the acknowledgement packet. When the transmission side sends the data a certain number of times, if it does not yet receive the acknowledgement packet (step S14), the control flow goes to step S3. The number of times data is repeatedly sent may be zero (not sent again).

When the first terminal sends data packets successively, the above-described procedure is repeated. In that case, as described above, a frequency channel different from the previously used channel is used to obtain the characteristics of slow frequency hopping. This also applies to a case in which the data packet is re-transmitted if the transmission side does not receive the acknowledgment after retransmission for the specified number of times, as shown in FIG. 6.

Communication between two terminals has been described above in this embodiment. Using the same sequence, simultaneous communication among a plurality of terminals in a multiple-access network can be allowed.

Referring now to FIG. 5, a case will be described in which the third data terminal 13 sends a packet to the fourth data terminal 14 while the first radio adapter 11' is communicating with the second radio adapter 12'.

Since the third and fourth data terminals 13 and 14 incorporate radio transfer sections corresponding to radio adapters, they need not form Ethernet frames when a data transmission request occurs. They can directly form a radio packet.

The third data terminal 13 sends a control packet through channel 1. Before sending this control packet, the terminal 13 may monitor the use of frequency channels and input in the control packet to be sent a channel number which is not being used by the first and second radio adapters (for example, channel 8), enabling data packet transmission to be performed quickly.

When the third data terminal 13 receives a receive-ready control packet from the fourth data terminal 14, the data terminal 13 again checks whether the specified frequency channel (channel 8 in this case) is not occupied, and then starts sending a data packet.

When the number of communication terminals increases, control channels may be congested. When the ratio between a control-packet length and a data-packet length is made almost equal to the ratio between the number of control channels and the number of data channels, all channels are equally used, making throughput maximum.

Using a multiple-access network as described above, transmission capacity can be expanded with slow frequency hopping. When 20 channels are provided each of which has a transmission capacity of 500 kbps, for example, system capacity is conventionally only 500 kbps because only a single hopping pattern can be used in terms of difficulty in synchronization acquisition. In this embodiment, however, when 20 channels are provided each of which has a transmission capacity of 500 kbps (the total capacity is 10 Mbps), the system can obtain a transmission path having a transmission capacity of 9 Mbps, excluding two control channels.

The time one terminal occupies a channel can meet the time required in slow frequency hopping. In the Ethernet interface, for example, since the maximum packet length is about 1,500 octets (12 Kbits), the time required for transmitting one packet in a channel having a transmission capacity of 500 kbps, namely the time one frequency channel is occupied is only about 24 milliseconds.

As described above, synchronization can be easily acquired in slow frequency hopping and a multiple-access network can be implemented.

This embodiment not only increases transmission capacity, but also provides an advantage that transmission capacity does not drop even when the number of terminals increases. In data communication networks, such as an Ethernet network, it is known that the transmission capacity per one terminal rapidly decreases when the number of terminals increases because a single line is used. This can also apply to a radio line. In a conventional system, which could not implement a multiple-access network, as the number of terminal used increases, the transmission capacity per one terminal abruptly decreases.

Figure 8:
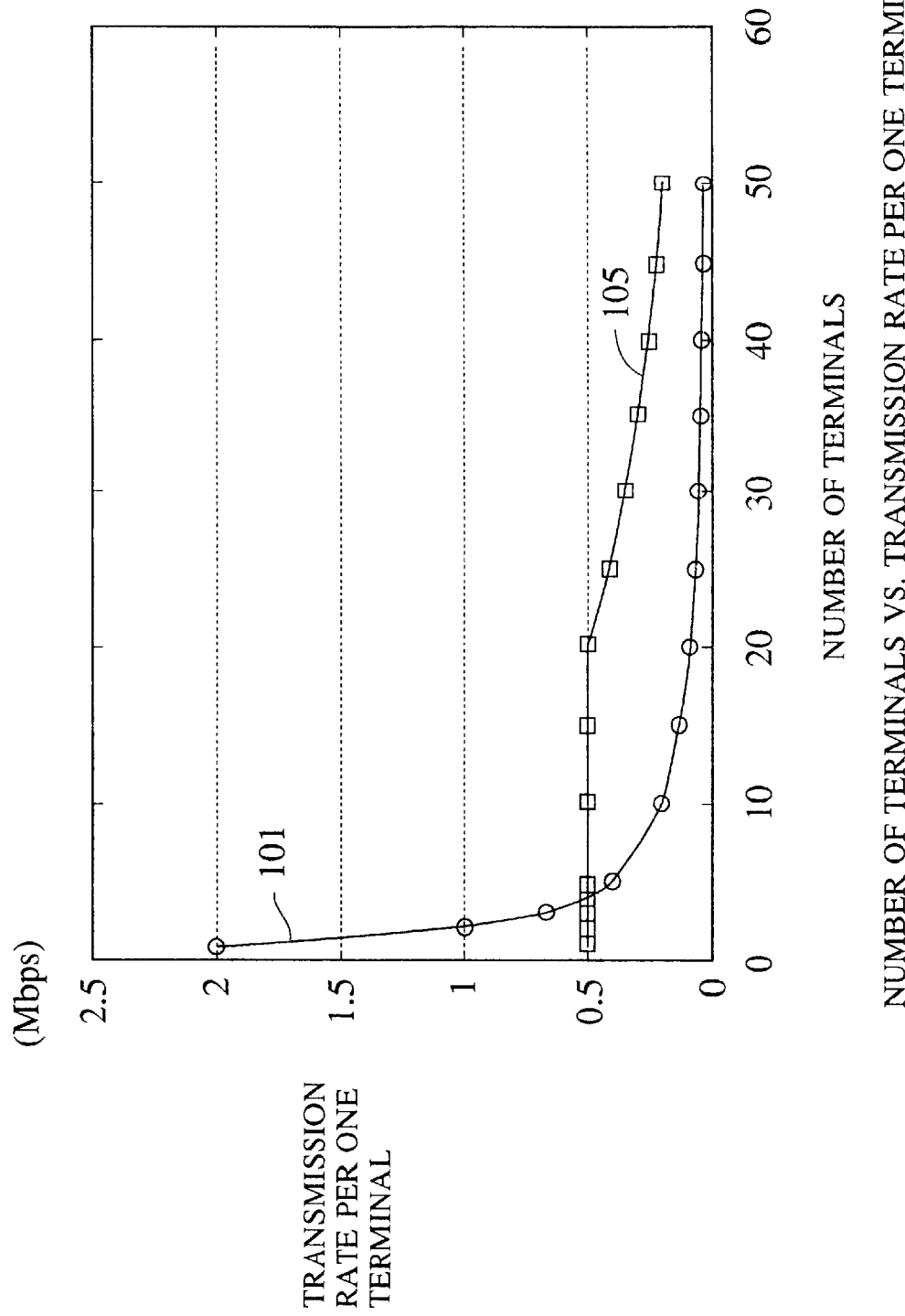
FIG. 8 is a graph showing the relationship between the number of terminals used and the transmission rate per one terminal in a conventional system and the system described in the first embodiment.

FIG. 8 is a graph showing the relationship between the number of terminals used and the transmission rate per one terminal in a conventional system and the system described in this embodiment. A first curve 101 indicates a relationship in the conventional system employing an expensive modulation method where a transmission capacity per channel is 2 Mbps. A second curve 105 indicates a relationship in the multiple-access network according to this embodiment where a transmission capacity per channel is 500 kbps.

When a small number of terminals are used, the conventional system has a larger transmission capacity.

When four or more terminals are used, the system according to this embodiment has a larger transmission capacity per terminal and retains a constant transmission rate up to about 20 terminals since the system has 20 channels, F3 to F22.

Although the conventional system uses the expensive modulation method, if the same modulation method is used, the system according to this embodiment has a larger transmission capacity per terminal at any number of terminals. Furthermore, since the system according to this embodiment holds a constant transmission rate, this system is suited to transmission of real-time data, such as audio and images, which does not allow any transmission delay.

A second embodiment according to the present invention will be described below.

Figure 9:
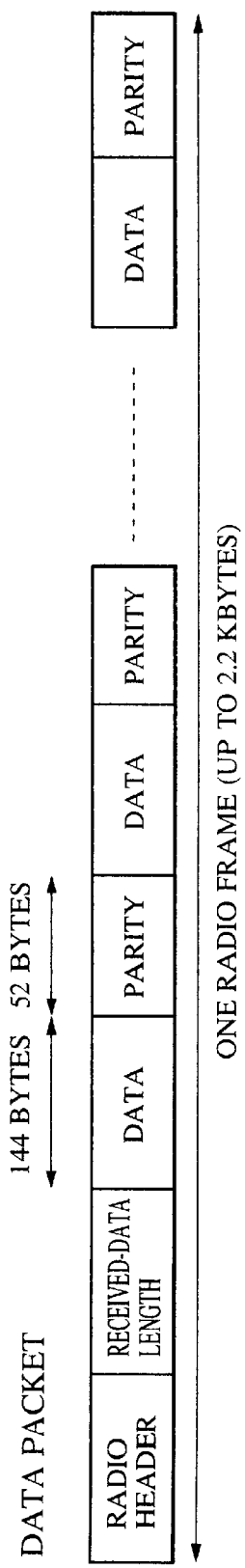
FIG. 9 shows the format of a packet used in the second embodiment.
Figure 10:
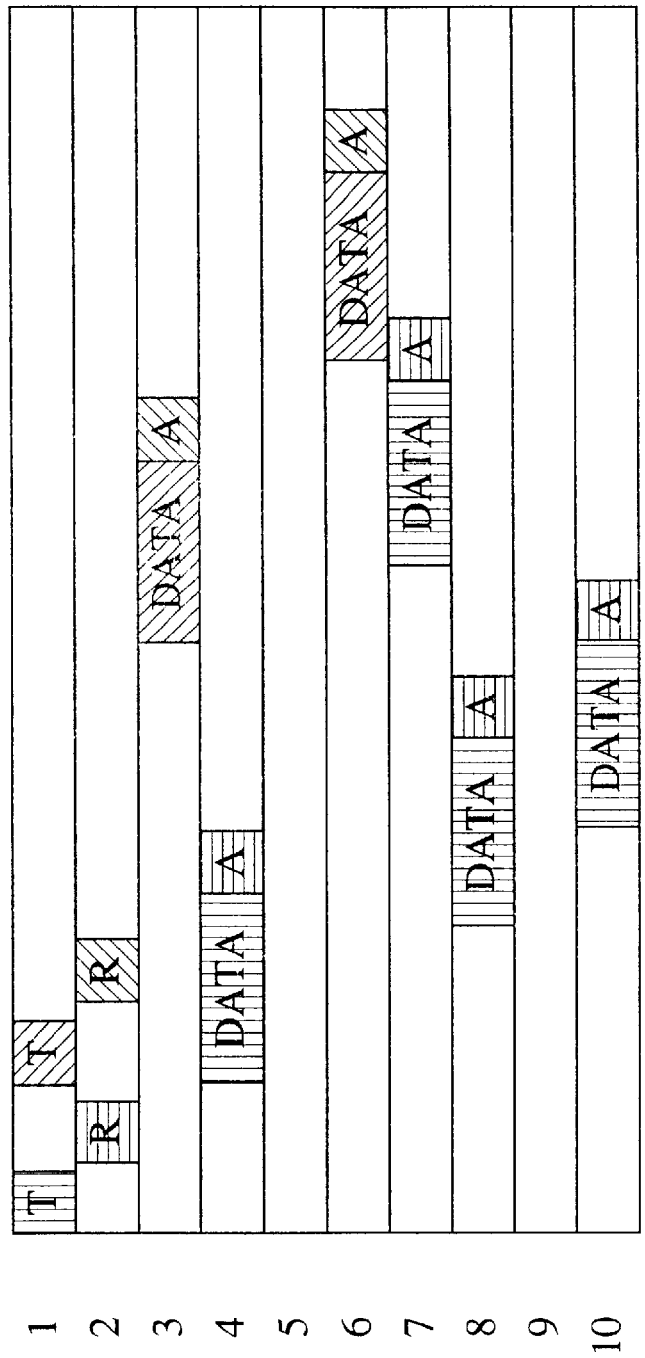
FIG. 10 is a chart indicating use of channels in the second embodiment.

In the first embodiment described above, a control channel is used to specify a frequency channel to be used for transmitting a data packet before the data packet is sent. When packets are successively transmitted, control channels can be less frequently used by inserting data specifying a channel to be used for the next packet and its packet number in the current data packet to be sent, as shown in FIG. 9. FIG. 10 illustrates the use of channels in this case.

Errors can be controlled with a usual selection re-transmission method because each data packet has its packet number. If the receiving side finds an error, only the packet in which the error has been found is transmitted again.

Employing these methods reduces times control channels are used and further increases the system throughput.

A third embodiment according to the present invention will be described below.

In the embodiments described above, data to be sent is transmitted on a radio line without any processing. When processing, such as adding error correction codes, is applied to data to be sent, however, the same advantages are obtained. In addition, reduction in data errors further increases actual transmission capacity.

FIG. 11 is a block diagram of the configuration of the radio adapter 22' in this embodiment. As shown in FIG. 11, an encoder and decoder 30 for error correction codes is added to the radio adapter described in the first embodiment (shown in FIG. 2).

FIG. 12 shows the format of a radio frame according to this embodiment. As shown in FIG. 12, additional data items for error correction processing are added.

In the configuration described above, when a data transmission request occurs, data is stored in RAM 25 and a transmission request is sent through a control channel, in the same way as the first embodiment. Since a control packet contains data as short as 30 bytes or less, the transmission error rate is low. Therefore, error correction coding is not applied.

A data packet is longer than a control packet, being about 50 to 1,500 bytes long. A data-packet transmission procedure is the same as the control-packet transmission procedure. A frequency channel to be used (for example, channel 4) is monitored. When the channel is occupied, the radio adapter waits until the channel becomes available for transmission. When the channel becomes available, a data packet starts being sent.

The data received from the terminal and stored in the RAM 25 is sent to the error-correction encoder 30. In this embodiment, a code 196 bytes long (196, 144 code) is used.

When the adapter 22' receives data from the terminal 21, it counts the length of the received data in bytes and checks whether the count is a multiple of 144. If the received data is 144 bytes long or less, data FF (in hexadecimal) is added repeatedly until the total number of bytes becomes 144, and then all the data is sent to the error-correction encoder 30. If a received data is 100 bytes long, for example, data FF is repeatedly added to fill 44 bytes, which is the difference between 144 bytes and the number of bytes in this data, and all the data is sent to the error-correction encoder 30. If received data is more than 144 bytes long, data FF is repeatedly added to make the number of bytes in the data a multiple of 144, and all the data is sent to the error-correction encoder 30. When received data is 1,000 bytes long, for example, data FF is repeatedly added to fill eight bytes, since the smallest multiple of 144 over 1,000 is 1,008.

The error-correction encoder 30 outputs the coded data of 196 bytes at a time and the data is stored in the RAM 25. The RAM 25 sends the data to the communication controller 26, and the communication controller 26 adds a radio header, including a flag, a transmission-destination address, a transmission-source address, and CRC check section for error detection, and data indicating the length of the data received from the terminal (1,000, for example), to the coded data, and all the data is sent through a radio line in the format shown in FIG. 12.

When the transmission-destination address matches the address of the radio adapter 22' at the receiving side, the adapter stores the received data in the RAM 25. The data is sent from the RAM 25 to the error-correction decoder 30 in units of 196 bytes, and error correction processing is applied to the received data. The error-correction decoder 30 outputs the data in units of 144 bytes. The data is stored in the RAM 25. Among the data, only a part whose length matches the number of bytes in the data received from the terminal (this information has been added in the header of the received packet), is transferred from the RAM 25 to the LAN controller 23, and then sent to the corresponding terminal through the LAN controller 23. The FF data added when the data was transmitted is deleted here.

When an error which cannot be corrected is not found in the received packet, an acknowledgement packet is formed and sent to the radio adapter at channel 4. Since the acknowledge packet is short, it is sent through a radio line without being error-correction-coded.

When the transmission side receives the receive acknowledgement packet, it terminates the data transmission. It waits to receive the next data, and at the same time, enters the standby state at channel 1 to receive a control packet from other radio adapters.

Applying the above-described error correction processing reduces the data error rate, reducing data re-transmission and the like. Thus, a radio line is used more effectively. As a result, actual transmission capacity further increases compared with that in the first embodiment.

In the above-described first and second embodiments, different control channels are used at the transmission side and receive side. When a single channel is used at both sides, the same advantages can be obtained. A fourth embodiment describes such a case. In the fourth embodiment, the ratio between the length of a control packet and that of a data packet is carefully set. When the number of control channels is reduced, control channels may be easily congested. To avoid such a congestion, a control packet needs to be made sufficiently short.

In a fifth embodiment, the receive side may transmit a receive-ready command at the channel specified by the transmission side (for example, channel F4).

In the above-described embodiments, only the system employing slow frequency hopping was described. However, the present invention can be applied to any system having a plurality of channels. For example, the same operation can be implemented in a system having time-division channels or a system using the direct sequence spread-spectrum method. The direct sequence spread-spectrum method spreads data with random codes having frequencies higher than that of the data. Assigning different codes to different channels enables a system using the direct sequence spread-spectrum method to be multiple-accessed.

In such a method, specifying a code used for sending a data packet, with a code used for a control channel, facilitates the acquisition of synchronization for each packet.

In the above-described embodiments, an electromagnetic wave is used as transmission means. The same advantages can be obtained when beam or infrared is used as a transmission medium. Assigning different wavelengths of beam or infrared to a plurality of channels enables the same system to be implemented.

The present invention can also provide various embodiments other than those described above within the scope specified in the claims described below.

What is claimed is:

1. A communication apparatus for performing frequency hopping communication with a communication partner, comprising:

communication means for communicating a communication packet to the communication partner through a communication channel;

notifying means for notifying the communication partner of a communication channel for communicating a next communication packet each time communicating a communication packet succeeds; and control means for (i) resending the communication packet through the same channel if an error occurs with the communication packet and for (ii) notifying, via said notifying means, of a different communication channel and resending the communication packet through the different communication channel if an error occurs with the communication packet even after resending it a predetermined number of times.

2. A communication apparatus according to claim 1, wherein the communication apparatus further comprises receiving means for receiving a response, issued by the communication partner, to the notification by said notification means, and said communication means communicates the communication packet in accordance with the response received by said receiving means.

3. A communication apparatus according to claim 1, further comprising selection means for selecting a communication channel from among a plurality of communication channels, wherein said selection means selects a communication channel different than the communication channel selected to communicate the preceding communication packet.

4. A communication apparatus according to claim 1, further comprising selection means for selecting a communication channel from among a plurality of communication channels, wherein said selection means selects, on the basis of the communication channel selected previously, a communication channel each time said communication means communicates the communication packet.

5. A communication apparatus according to claim 1, wherein said notification means performs the notification by using a control channel for communicating control information.

6. A communication apparatus according to claim 1, further comprising selection means for selecting a communication channel from among a plurality of communication channels, wherein said selection means selects one communication channel from the plurality of communication channels through which to communicate the communication packet.

7. A communication method for performing frequency hopping communication with a communication partner, the method comprising:

a communication step of communicating a communication packet to the communication partner through a communication channel;

a notifying step of notifying the communication partner of a communication channel for communicating a next communication packet each time communicating a communication packet succeeds; and a control step of (i) resending the communication packet through the same channel if an error occurs with the communication packet and for (ii) notifying, in said notifying step, of a different communication channel and resending the communication packet through the different communication channel if an error occurs with the communication packet even after resending it a predetermined number of times.

8. A communication method according to claim 7, wherein said notification step includes a receiving step for receiving a response to the notification, and in said communication step, the communication packet is transmitted in accordance with the response received in said receiving step.

9. A communication method according to claim 7, further comprising a selection step of selecting a communication channel from among a plurality of communication channels, wherein said selection step selects a communication channel different than the communication channel selected to communicate a preceding communication packet.

10. A communication method according to claim 7, further comprising a selection step of selecting a communication channel from among a plurality of communication channels, wherein said selection step selects, on the basis of the communication channel previously selected, a communication channel each time the communication packet is transmitted in said communication step.

11. A communication method according to claim 7, wherein, in said notification step, the notification is performed through a control channel for communicating control information.

12. A communication method according to claim 7, further comprising a selection step of selecting a communication channel from among a plurality of communication channels, wherein in a selection by said selection step, a communication channel is selected from the plurality of communication channels.

\* \* \* \* \*

UNITED STATES PATENT AND TRADEMARK OFFICE
CERTIFICATE OF CORRECTION

PATENT NO. : 6,870,874 B2 Page 1 of 1
DATED : March 22, 2005
INVENTOR(S) : M. Izumi It is certified that error appears in the above-identified patent and that said Letters Patent is hereby corrected as shown below:

Drawings,
Figures 5 and 10, "CHANNER" should read -- CHANNEL --.

Column 3,
Line 54, "transmission destination" should read -- transmission-destination --.

Column 4,
Line 17, "data" should read -- that data --.

Column 7,
Line 12, "acknowledge" should read -- acknowledgment --.

Signed and Sealed this

Seventh Day of February, 2006

JON W. DUDAS
*Director of the United States Patent and Trademark Office*